Patented Apr. 24, 1951

2,550,205

UNITED STATES PATENT OFFICE 2,550,205

ACYLOXYMETHYL SUBSTITUTED SILOXANES

John Leopold Speier, Jr., Pittsburgh, Pa., assignor to Dow Corning Corporation, Midland, Mich., a corporation of Michigan No Drawing. Application July 2, 1948, Serial No. 36,813. In Great Britain August 26, 1947

4 Claims. (Cl. 260—448.2)

The present invention relates to the production of organic esters of primary alcohols which are substituted with organosilicon compositions in the alpha position.

The chemistry of the organosilicon compounds has been to a large extent, for many years past, a thing apart from organic chemistry. In the previous work on the organosilicon compounds, the major development has been in silanes and siloxanes substituted with hydrocarbon radicals on the silicon and in which the functional bonds were between the silicon and atoms linked directly thereto. The fact that the primary functionality of these materials was directly associated with the silicon, resulted in the major development work centering around hydrolyzable silanes and around variations in the geometry of the skeleton of the siloxane molecules derived by hydrolysis thereof. These materials were free of functionality other than that inherent in siloxane bonds.

Objects of the present invention are to provide methods for the production of organosilicon compositions which contain functional linkages in radicals linked to the silicon by carbon to silicon linkages. This functional linkage in the radical which is linked to the silicon results in the compound partaking to a major extent of the characteristics of organic compounds other than paraffins while maintaining to some extent many of the properties of siloxanes. Further objects are the provision of methods for the production of compositions of the type indicated.

In accordance with the present invention, esters are prepared which contain organosiloxane radicals in the alpha position of a primary alcohol which organosiloxane radicals are linked to the alpha carbon by carbon to silicon bonding. Compositions of this character are produced by interacting a siloxane which is substituted both with hydrocarbonyl radicals and chloromethyl radicals with a metal salt of a carboxylic acid in the presence of a solvent for this salt. Preferably, the carboxylic acid in free state or its anhydride is employed as solvent. The hydrocarbonyl chloromethyl siloxane is preferably a completely condensed siloxane.

The chloromethyl substituted siloxanes which are employed in the process of the present invention may be obtained by any suitable or appropriate means. Thus, they may be produced by the chlorination of trimethyl silicon chloride to produce chloromethyl dimethyl silicon chloride. This may behydrolyzed and condensed to yield symmetrical bis-chloromethyl tetramethyl disiloxane. It may likewise be co-hydrolyzed and co-condensed with dimethyl silicon dichloride to produce linear dimethyl siloxanes end-blocked with chloromethyl dimethyl silyl groups. The choloromethyl dimethyl silicon chloride may likewise be co-hydrolyzed and co-condensed with chloromethyl methyl silicon dichloride, produced by direct chlorination of dimethyl silicon dichloride. Upon co-condensation, linear chloromethyl methyl siloxanes are obtained which are endblocked with chloromethyl dimethyl silyl groups. The chloromethyl dimethyl silicon chloride may be co-hydrolyzed and co-condensed with trimethyl silicon chloride. When these two materials are in equivalent amounts there is obtained a 50 mol per cent yield of chloromethyl pentamethyl disiloxane and a 25 mol per cent yield of symmetrical bis-chloromethyl tetramethyl disiloxane.

In the direct chlorination processes above described, good yields of products containing chloromethyl radicals are obtainable. If other than methyl radicals are contained in the silanes chlorinated, the separation of relatively pure materials from the chlorination products is somewhat complicated due to the chlorination of other than methyl radicals. Accordingly, when it is desired to produce siloxanes which contain other than methyl radicals linked to the same silicon as the chloromethyl radicals, it is desirable to effect the chlorination of a methyl silicon chloride free of other organic radicals. The product of this chlorination may then be subjected to reaction with a Grignard reagent to introduce into the silane any desired organic radicals. Thus, the remaining radicals in the siloxane may be alkyl radicals, either lower alkyl, such as methyl, ethyl or higher alkyls such as octadecyl, or they may be aryl radicals, such as phenyl.

Chloromethyl methyl silicon dichloride, produced as above indicated, may be co-hydrolyzed and co-condensed with trimethyl silicon chloride to produce linear chloromethyl methyl siloxanes end-blocked with trimethyl silyl groups.

Cyclic siloxanes may also be employed in the process of the present invention. These cyclic siloxanes contain one or more chloromethyl radicals with the remainder being hydrocarbonyl radicals. In these compounds the total number of radicals is equal to twice the number of silicon atoms. Compounds of this type may be produced by direct chlorination of cyclic dimethyl siloxanes. In the production of these materials by direct chlorination it is desirable to chlorinate only very mildly so as to introduce but one chlorine per cycle. By this method chloromethyl heptamethyl cyclotetrasiloxane may be readily produced.

When more than one chloromethyl radical per cycle is desired it is preferable to produce these compounds by the hydrolysis and condensation of a chloromethyl hydrocarbonyl silicon dichloride. By this method both cyclic and highly polymeric linear siloxanes are produced. The chloromethyl hydrocarbonyl silicon dichloride may be produced by the chlorination of dimethyl silicon dichloride, or by the chlorination of monomethyl silicon trichloride followed by the introduction of one hydrocarbon radical by coupling with a Grignard reagent.

The chloromethyl siloxanes, as indicated, are reacted with a metal salt of a carboxylic acid in the presence of a solvent for this salt. The carboxylic acid of this salt, as is known in organic chemistry in the general type of reaction with which the present invention deals, may be of widely divergent character. The dicarboxylic acids and the aromatic carboxylic acids may be employed if desired, though it is preferred to employ monocarboxylic aliphatic acids. The reaction is best conducted in the presence of the carboxylic acid in the free state, the salt of which is employed. Other solvents for the salt may be employed if desired. The metal of the salt, as is known in the chemistry of this reaction is one the chloride of which is insoluble in the solvent. Thus, salts of the alkali metals, the alkali earth metals and silver are suitable.

The reaction involved in the process of the present invention appears to proceed in varying rates depending upon the temperature. At room temperature the reaction would appear to proceed at an impracticably low rate. It is therefore desirable in general to heat the reaction mixture to above 100° C. The temperature in all events should be above the melting point of the carboxylic acid which is employed inasmuch as the carboxylic acid functions as solvent for the system. During the course of the reaction the metal chloride is formed and precipitated. Following formation of a substantial amount of the metal chloride, the reaction mixture is washed with water to remove the metal chloride together with any residual carboxylic acid salt and solvent. In case of carboxylic acids which are insoluble in water these may be removed by neutralizing and washing the reaction mixture with dilute alkali metal hydroxide solution. In the case of water insoluble metal salts, such as silver chloride, the salt may be removed by filtration.

Pressure is not essential to the present reaction, though sufficient pressure should be employed to maintain the acid in the system, as when acetic or benzoic acid is employed.

The products produced in accordance herewith are polysiloxanes, the polymer units of which are of the general formula

in which R represents acyloxymethyl and hydrocarbon radicals, at least some of the R's being hydrocarbon radicals and at least one of the R's being an acyloxymethyl radical and $n$ is an integer from 2 to 3 inclusive.

The esters of primary organic alcohols of the type produced in accordance herewith are of principal utility as intermediates for the production of a wide range of organic materials containing silicon in the molecule, which materials have not heretofore been produced. Thus, one of the interesting and extremely important materials which can be produced from these esters is symmetrical bis-hydroxymethyl tetramethyl disiloxane which is produced by alcoholysis of the corresponding ester. This is a desirable material for making polyurethane type of resins. They are also raw materials for the production of other esters.

EXAMPLES

Example 1

One equivalent of chloromethyl pentamethyl disiloxane was heated under reflux at atmospheric pressure for 24 hours with 1.1 equivalent of anhydrous potassium acetate in the presence of glacial acetic acid in amount equal in volume to the disiloxane employed. Potassium chloride precipitated. The reaction mixture was then washed with water until the wash water was neutral. The reaction product was then distilled. Upon distillation there was obtained a 25 mol per cent yield of hexamethyl disiloxane, a 25% yield of symmetrical bis-acetoxymethyl tetramethyldisiloxane and 50 mol per cent yield of acetoxymethyl pentamethyl disiloxane. The two esters had the following formulae respectively:

(1) $[CH_3COOCH_2Si(CH_3)_2]_2O$
(2) $CH_3COOCH_2Si(CH_3)_2OSi(CH_3)_3$

Compound (1) was found to have the following properties:

A boiling point of 250° C. at 760 mm., an index of refraction at 25° C. of 1.4215, a specific gravity at 25° C. of 0.993, a molar refraction of 70.75 and a saponification equivalent of 141.

Compound (2) was found to have the following properties:

A boiling point of 180° C. at 735 mm., an index of refraction of 1.4040 at 25° C., density of 0.902 at 25° C., a molar refraction of 59.84 and a saponification equivalent of 220.

Example 2

The procedure of Example 1 was repeated employing instead of the disiloxane there used, the symmetrical bis-chloromethyltetramethyldisiloxane. A quantitative yield of the compound designated (1) in Example 1 was obtained.

Example 3

A mixture was prepared of 474 parts by weight of chloromethyl heptamethyl cyclotetrasiloxane, 155 parts of anhydrous potassium acetate and 623 parts of glacial acetic acid. The mixture was refluxed. After 24 hours some potassium chloride had precipitated showing interaction had occurred. After 5 days of refluxing, the mixture was filtered and the reaction mixture washed with water. By this procedure a polymeric siloxane was obtained in which most of the radicals were methyl radicals and the remainder were acetoxy methyl radicals.

Example 4

A mixture of 136 parts by weight of symmetrical bis-chloromethyltetramethyldisiloxane, 174 parts of sodium benzoate and 100 parts of benzoic acid was heated in a bomb at a temperature between 200 and 240° C. for 7 hours. The bomb was then cooled and the contents washed with water. Tests for chloride showed that reaction had occurred. There remained a mixture of water-insoluble liquid and benzoic acid. The benzoic acid was removed from the liquid by washing with hot water and with an aqueous solution of sodium carbonate. A yield was obtained of 226 parts of an insoluble liquid, which represented a 96% yield of symmetrical bis-benzoxymethyl tetramethyl disiloxane. The density of this liquid is greater than 1.

Example 5

A chloromethyl methyl siloxane polymer was employed which was produced by interacting chloromethyl methyl silicon dichloride with more than two mols of glacial acetic acid per mol of halide. This siloxane in mixture with acetic acid was reacted with potassium acetate at the boiling point of the acetic acid. The acetic acid was removed by distillation. The reaction product was washed with water. The product so produced had an index of refraction at 25° C. of 1.4426 and a viscosity at 25° C. of 136.7 centistokes. The viscosity temperature slope was found to be equal to 1812.

Example 6

Dichloro(chloromethyl)methylsilane, in amount of 297 grams, was added to 588 grams of potassium acetate in acetic acid solution. The mixture was heated under reflux for 16 hours. The product so obtained was distilled whereby acetic anhydride was removed therefrom. The product was washed with water to remove residual acid and salts. A high polymer was thereby produced which had the formula $(CH_3COOCH_2SiCH_3O)_n$. When this polymer was heated, exposed to air for 62 hours at 150° C., there was observed no loss of weight therefrom. The polymer had an index of refraction at 25° C. of 1.4428 and a viscosity at 25° C. of 136.7 centistokes and at 3.3° C. of 403 centistokes. The polymer units of the polymer so produced correspond to the formula $CH_3COOCH_2SiCH_3O$.

Example 7

Dichloro(chloromethyl)methylsilane was reacted with phenylmagnesium bromide by mixing two mols of the silane and 2.8 mols of the phenyl Grignard reagent. The product was distilled and the following materials were obtained thereby:

(1) Chloro(chloromethyl)methylphenylsilane having a boiling point of 136° C. at 24 mm.

(2) (Chloromethyl)methyldiphenylsilane which had a boiling point of 198° C. at 23 mm., an index of refraction at 25° C. of 1.5785 and a density at 25° C. of 1.101.

The chloro(chloromethyl)methylphenylsilane was hydrolyzed and the hydrolyzate distilled. There was thereby obtained symmetrical di-(chloromethyl)dimethyldiphenyldisiloxane, $$[C_6H_5CH_3(CH_2Cl)Si]_2O$$

This compound was found to boil at 237° C. at 24 mm., to have an index of refraction at 25° C. of 1.5466 and a density at 25° C. of 1.161.

The disiloxane so produced was refluxed with a glacial acetic acid solution of potassium acetate, a slight excess of the potassium acetate being employed. After 18 hours of refluxing the mixture was washed with water and the product was distilled, whereby there was obtained symmetrical bis(acetoxymethyl) dimethyldiphenyldisiloxane. This compound had a boiling point of 210° to 220° C. at 1.4 mm., an index of refraction at 25° C. of 1.5118 and a density at 25° C. of 1.092.

40.2 grams of the disiloxane so produced were mixed with 36.7 grams of methylsteryldichlorosilane and 21.2 grams of phenylmethyldichlorosilane. This mixture was dissolved in ethanol. Reaction occurred which resulted in the hydrolysis of the silicon bonded chlorine, in interaction to produce a polysiloxane, and in the alcoholysis of the acetoxymethyl substituents to give hydroxymethyl substituents. The product so produced is a polysiloxane of the average composition.

$$(HOCH_2C_6H_5CH_3SiO_{0.5})_2$$
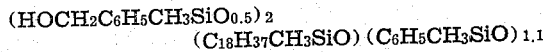
$$(C_{18}H_{37}CH_3SiO)(C_6H_5CH_3SiO)_{1.1}$$

This product is a viscous yellow fluid.

10 grams of this fluid were mixed with 2.3 grams of toluene-3,5-diisocyanate which was readily soluble in the siloxane and yielded a sparkling clear solution which grew warm and increased in viscosity until it became very thick. This product is a stable resinous liquid.

Example 8

The symmetrical bis(acetoxymethyl) dimethyldiphenyldisiloxane described in Example 6, in amount of 20.1 grams, was mixed with 11.1 grams of hexamethylcyclotrisiloxane, 177 cubic centimeters of methanol and 3 drops of concentrated aqueous hydrochloric acid. This resulted in the formation of a siloxane polymer and in the methanolysis of the acetoxymethyl substituents to produce hydroxymethyl substituents. The average formula of the product so produced is as follows:

$$HOCH_2CH_3C_6H_5Si[OSi(CH_3)_2]_3$$
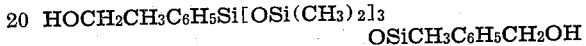
$$OSiCH_3C_6H_5CH_2OH$$

This product was recovered from the reaction mixture by removing the volatile materials by passing a stream of dry air through the product at 125 mm. pressure. This product is a slightly colored odorless liquid.

This product, in the amount of 10 grams, was mixed with 3.4 grams of toluene-3,5-diisocyanate. The mixture was stirred and became a light amber colored homogeneous solution of about 200 centistokes viscosity. The viscosity continued to increase during the course of the reaction. When the reaction rate slowed down as evidenced by the reaction mixture cooling, the mixture was heated to 135° C. for 15 minutes. A viscous liquid was thereby obtained. This polymer was applied to a metal panel as a coating. The panel so coated was polymerized by exposure to air for 3 days. There was thereby obtained a tough flexible coating. Heating of the panel for 2 days at 150° C. did not affect the properties of the coated panel.

That which is claimed is:

1. Polysiloxanes, the polymer units of which are of the general formula $$R_nSiO_{\frac{4-n}{2}}$$

in which R represents a member of the group consisting of alkyl, aryl, acetoxymethyl, and benzoxymethyl, in which polysiloxanes some of the R's are of the group consisting of alkyl and aryl radicals and at least one of the R's is selected from the group consisting of acetoxymethyl and benzoxymethyl radicals, and $n$ is an integer from 2 to 3 inclusive.

2. Compositions in accordance with claim 1 in which R represents acetoxymethyl radicals and methyl radicals.

3. $[CH_3COOCH_2Si(CH_3)_2]_2O$.

4. $CH_3COOCH_2Si(CH_3)_2OSi(CH_3)_3$.

JOHN LEOPOLD SPEIER, Jr.

REFERENCES CITED

The following references are of record in the file of this patent:

Volnov: "Jour. Gen. Chem." (U. S. S. R.) vol. 10 (1940), pages 1600–1604.

Whitmore et al.: "Jour. Am. Chem. Soc.," vol. 68 (1946), pages 481–484.

Speier et al.: "Jour. Am. Chem. Soc.," vol. 70 (1948), pages 1117–1119.

Krieble et al.: "Jour. Am. Chem. Soc.," vol. 68 (1946), pages 2291–2293.